Patented July 7, 1931

1,813,367

UNITED STATES PATENT OFFICE

CLAUDE S. THOMPSON, OF SEATTLE, WASHINGTON, ASSIGNOR TO THOMPSON MANUFACTURING CO., OF SEATTLE, WASHINGTON, A CORPORATION OF WASHINGTON

FIRE EXTINGUISHER

No Drawing.   Application filed November 24, 1925.   Serial No. 71,204.

This invention relates to so-called chemical fire extinguishers, and its principal object is to provide a novel and efficient chemical compound for extinguishing, retarding, and preventing fire, and which may be used in connection with ordinary hand fire-extinguishers such as now on the market, or by dipping, spraying, or brushing. Combustible materials may also be impregnated with the compound to prevent combustion thereof and the compound may also be mixed with plaster of Paris, or cement or any other material which will set or harden when dry, and applied to the walls and interior surfaces of buildings to prevent or retard combustion.

I will explain some practical embodiments and uses of the invention to enable others to adopt and use the same, and will summarize in the claims the essential features of the invention for which protection is desired.

In the usual fire extinguishers using chemical compounds no deoxidizing action is obtained, and the prevention of combustion depends, for the most part, upon the formation of volatile compounds (usually carbon dioxide, ammonia, or ammonium compounds), which produce vapors at low temperatures, but such compounds prevent combustion only when the vapors are present in sufficient quantities to exclude air from the burning material.

I have found that the presence of a volatile oxide, such as arsenic trioxide, which is a deoxidizing agent, will to a great extent prevent oxidization of combustible materials or gases by preventing the oxygen of the air combining with the carbon in such materials or gases. I have also found that numerous arsenic compounds when heated liberate arsenious or arsenic oxide and can be substituted for the arsenic trioxide in an equivalent amount. I have also found that metallic arsenic in a finely divided condition, when heated, oxidizes to arsenic oxide and acts similarly to arsenic oxide in preventing combustion.

The deoxidizing effect of arsenious oxide is well illustrated by the manner in which it reacts as a poison upon the human body. Its mere presence in even very small quantities prevents the corpuscles of the blood absorbing oxygen from air breathed into the lungs. It acts similarly on carbonaceous materials. Another example of the deoxidizing effect of arsenious oxide is shown by its effect upon drying vegetable oils, such as linseed oil, perilla oil, or China-wood oil. In such oils amounts of arsenious oxide as small as one tenth of one percent will greatly retard the oil from setting up and drying, and larger amounts (one percent) will prevent the oil from drying for a long period of time. It is well recognized that the drying of vegetable oils depends upon absorption of and combining with oxygen.

One efficient compound for extinguishing, retarding and preventing fires in accordance with my invention is as follows:

|                  | Pounds |
|------------------|--------|
| Arsenic trioxide | 3      |
| Borax            | 7      |
| Caustic soda     | 6      |

Sufficient water to make five gallons of a solution of the compound.

The amount or concentration of arsenic may vary, depending upon convenience and particular conditions in view; stronger solutions requiring less application of liquid, and weaker solutions generally requiring more application of the liquid. Furthermore, combustible material involving large logs or stumps may advantageously be treated with concentrated applications, while more dilute applications are sufficient for light flimsy material.

Such compound will act to prevent, extinguish, and retard fires by (1) the liberation of a non-supporter of combustion (volatile substance); (2) the formation of a glaze upon the combustible surface; (3) the presence of a deoxidizing agent; (4) the absorption of heat through decomposition of the chemicals of the compound; and (5) the deliquescent or water-absorbing qualities of the compound.

In my compound the principal element is arsenious oxide (arsenious trioxide) or an arsenic compound that liberates or forms an oxide of arsenic when heated, which is more effective and efficient than volatile ammonium salts, alkaline chlorides, water vapor, and other volatile materials as when the arsenic trioxide is heated it not only forms a vapor or gas to exclude air from the combustible materials, but also acts as a deoxidizing agent; its mere presence even in small quantities in the air or upon the burning surface, retarding or preventing the oxygen of the air from combining with the heated combustible material.

Alkali salts, such as ammonium salts; ammonia, carbon dioxide, carbon tetrachloride, alkali chlorides, do not possess deoxidizing properties, but are non-supporters of combustion, and their vapors when present in sufficient quantities, will exclude air from the burning or heated material.

Furthermore the caustic alkali reacts upon cellulose or carbonaceous materials so as to cause penetration of the fire preventive compound into such material both physically and chemically. The caustic alkali also causes moisture to collect and remain upon the combustible material and thus creates a high degree of humidity on and immediately above same. The presence of calcium chloride or magnesium chloride maintains a more wet condition. The humidity itself acts as a retarder of combustion. For treating materials to be painted, these high humidity compounds are omitted or added only in small amount.

Another reason for using caustic soda, or a hydroxide of the alkali group of metals, is that it dissolves the oxides of arsenic to form sodium arsenic which is very much more soluble in water than arsenic trioxide, and the surface treated with this solution would be rendered much more fire-proof than if it were treated with a straight arsenic trioxide solution. The excess of the caustic soda, or hydroxide of the alkali group of metals, reacts with the cellulose of wood or other materials causing it to swell, thus permitting penetration to a greater extent than mere surface penetration or surface application would cause; also the same combines chemically with the cellulose material to form a sodium compound with the cellulose and resinous material in the wood or fibre, thus holding the arsenic or other materials in a permanent condition. These materials thereby are much more resistant to the weathering attacks of rain, and exposure than otherwise would be if the arsenic was applied as a straight solution.

The presence of the non-volatile constituents, and the glazing of the surface by the fusion of the borax or other fusible material, assist in retarding burning, the glaze and salts helping to exclude the oxygen necessary to support combustion. The liberation of the chemically combined water, and the hydroscopic water also retard the burning. When the arsenic is present in the compound as a salt (sodium arsenite or other arsenic compound or element), the compound will first be broken up by heat before the arsenious oxide gas is liberated. This breaking up absorbs much heat and thus the temperature of the burning material is lowered, thereby retarding the rate of combustion.

Other oxides, or compounds included in the bismuth group, namely, oxides or compounds of bismuth, antimony, tantalum, niobium, vanadium, nitrogen, and phosphorus, may be used in place of arsenious oxide, but have been found to be less effective and efficient. The high temperature required to vaporize the other oxides allows the combustible material to become highly heated before their vapors become effective, and they also lack, relatively, the deoxidation action of arsenious oxide. For instance, a larger quantity of antimony oxide vapor than arsenic oxide vapor must be present to have any noticeable effect. All members of the bismuth group of the periodic system have deoxidizing effects to a certain extent, some more than others, that is, their oxides have these deoxidizing effects or possibly other forms in which they occur, such as the sulphates, etc. of this group.

Although I prefer to use arsenious oxide, I do not desire to be limited to that particular compound. Finely divided or powdered metallic arsenic might be used, and also arsenites, and arsenates either soluble or insoluble in water, and in some instances more complicated arsenic compounds which when heated will liberate arsenic trioxide might be used.

If arsenic pentoxide were available, we could substitute it for the arsenious trioxide, in which case sodium arsenate would be formed, which on being heated breaks down into sodium arsenite and free oxygen. It would not be as desirable as the present formula owing to the free oxygen liberated.

Arsenious trioxide is soluble in hydrochloric and other acids and could be used in that form instead of with the caustic soda. However, in that formula the borax would be less soluble and hence such formula would not be as satisfactory as the one above stated.

In the specific compound above given, the combination of the arsenic trioxide with the caustic soda form a chemical combination, or react to form sodium arsenite. There would however be an excess of caustic soda in the compound as well as free borax in solution.

The flame destroying properties of my compound are principally due to the deoxidization effect of the arsenic trioxide upon the gases liberated by the heat of burning. As above explained, even when arsenic is present in small quantities the deoxidization effect will prevent the oxygen of the air from combining with the heated combustible materials. I prefer to use the arsenic trioxide combined with soda, potassium, or ammonium rather than to use a straight solution of arsenic trioxide, since the combination is more soluble in water at ordinary temperatures. The caustic alkali is also used to stabilize the solution of arsenic compounds; to increase its solubility; to prevent its separation from the solution; and to cause penetration of the compound into the material which are thereby made permanent.

In place of caustic soda, sodium carbonate or carbonates or bicarbonates of the alkali group may be substituted; also any hydroxide will be effective. In many cases such as coating, where dry, or mixed in paints or other materials the hydroxides, carbonates, or bicarbonates of the earth group will be the best to use.

The property of borax in this compound is to form a glaze, or slag, under heat. Any material which under heat will form such a glaze or slag may be substituted therefor. For example, phosphates might give similar results.

My novel compound may be sprayed directly into the flames by any ordinary fire-extinguisher; or the compound may be applied to surfaces before combustion takes place and permitted to dry, and since it is non-volatile at ordinary temperatures, it will react as well and in the same manner when dry as when in solution. For protection of buildings and other structures, the compound may be mixed with plaster of Paris, or cement, or any other material which will set or harden when dry, and applied to the walls and ceilings of such structures to render them non-combustible, or used as is, such as in the treatment of shingles, roofing paper, matches, or other materials.

The frame work and sheeting of buildings during construction may be impregnated with the compound, which penetrates into the wood, and will dry and remain in the pores of the wood indefinitely. After completion of the building, if sufficient heat arises to start combustion, the compound, being heated will automatically combat or prevent the spread of fire.

Tests have been made upon various materials coated with my compound, f. i., paper treated with my compound would not ignite even when thrown into a hot fire, but only charred in the treated areas. The compound was also tested in combatting a forest fire, giving excellent results. In this test the liquid was sprayed on brush, leaves and grass in advance of the fire which was spreading rapidly; where the compound had been sprayed the fire went out, leaving no smouldering places. Applied to the burning ends of logs it immediately extinguished the flames, and cooled down the red hot coals, which soon ceased to smoulder. Applied to hollow burning trees and stumps in which intense heat had been created the flames immediately disappeared, and the smouldering gradually ceased. Also a piece of wood saturated with my compound was put into the flame of a rotary oil burner immediately extinguishing the flame.

Wherever the word "deoxodizing" is used throughout the specification and claims I mean to describe that property whereby oxidization is prevented, either entirely or in part.

I do not limit my invention to the exact proportions above stated for obviously changes may be made within the scope of the claims.

What is claimed is:

1. A fire extinguishing compound consisting of approximately arsenic trioxide 3 lbs.; borax 7 lbs.; caustic soda 6 lbs.; and water to make up 5 gallons of the compound.

2. A fire extinguishing compound consisting of an arsenic compound equivalent to 3 lbs. arsenic trioxide; borax 7 lbs.; caustic soda 6 lbs. and water to make up 5 gallons of the compound.

3. A fire extinguishing composition comprising an arsenite compound; an alkali; and borax.

4. The method of extinguishing a fire, comprising liberating a deoxidizing gas consisting of arsenic trioxide, and subduing the combustion by exposure thereto.

5. The method of extinguishing fire, which comprises providing by the combustion heat a volatilized oxidation-inhibitor in the form of an oxide of an element of the bismuth group of higher atomic weight than phosphorus, and subduing the combustion by exposure thereto.

6. The method of extinguishing fire, which comprises providing by the combustion heat a volatilized oxidation-inhibitor in the form of arsenious oxide, and subduing the combustion by exposure thereto.

7. A fire extinguishing composition, which comprises an agent to provide by the combustion heat a volatilized oxidation-inhibitor in the form of an oxide of an element of the bismuth group of higher atomic weight than phosphorus, and an agent for fixing such aforesaid agent upon cellulose.

8. A fire extinguishing composition, which comprises an agent to provide at combustion heat a volatilized oxidation-inhibitor in the form of an oxide of an element of the bismuth group of higher atomic weight than phosphorus, and an agent to fuse at such combustion temperature to a glaze.

9. A fire extinguishing composition, which comprises an agent to provide at combustion heat a volatilized oxidation-inhibitor in the form of arsenious oxide an agent for fixing such aforesaid agent upon cellulose, and an agent to fuse at such combustion temperature to a glaze.

10. A fire extinguishing composition, including an arsenic compound, an alkali, borax and water, the concentration of the arsenic compound being about three pounds per five gallons of water.

In testimony that I claim the foregoing as my own, I affix my signature.

CLAUDE S. THOMPSON.